United States Patent
Russell et al.

(10) Patent No.: US 6,254,716 B1
(45) Date of Patent: Jul. 3, 2001

(54) APPARATUS AND METHOD FOR USE IN THE MANUFACTURE OF MULTIPLE LAYER OPTICAL DISC

(75) Inventors: Robert Lowell Russell, Cloverdale; David Jeffrey Chullino, Jr., Terre Haute, both of IN (US)

(73) Assignees: Sony Corporation, Tokyo (JP); Digital Audio Disc Corporation, Terre Haute, IN (US)

(*) Notice: Subject to any disclaimer, the term of this patent is extended or adjusted under 35 U.S.C. 154(b) by 0 days.

(21) Appl. No.: 09/426,437

(22) Filed: Oct. 25, 1999

(51) Int. Cl.$^7$ .............................. B32B 31/20; B29C 65/54
(52) U.S. Cl. ......................... 156/286; 156/382; 156/578
(58) Field of Search ........................... 156/104, 285, 156/286, 295, 381, 382, 578; 118/50; 427/294

(56) References Cited

U.S. PATENT DOCUMENTS

| | | |
|---|---|---|
| 5,242,731 | 9/1993 | Shimizu et al. . |
| 5,284,538 | 2/1994 | Suzuki et al. . |
| 5,318,653 * | 6/1994 | Toide et al. ........................... 156/295 |
| 5,378,517 | 1/1995 | Suzuki et al. . |
| 5,789,053 | 8/1998 | Asai . |
| 5,824,385 | 10/1998 | Itoigawa et al. . |
| 5,879,774 | 3/1999 | Taylor et al. . |
| 5,961,777 * | 10/1999 | Kakinuma ........................... 156/380.9 |

* cited by examiner

Primary Examiner—Michael W. Ball
Assistant Examiner—John T. Haran
(74) Attorney, Agent, or Firm—Wood, Herron & Evans, L.L.P.

(57) ABSTRACT

An apparatus for joining two optical discs into a disc assembly having multiple layers of data has a disc processing chamber for supporting the first and second discs, wherein each of the discs has a layer of data on a first side thereof. The processing chamber is fluidly connected to a tank containing a bonding fluid. A vacuum pump is selectively connectable to the processing chamber and the tank for selectively evacuating air out of each. An actuator is operatively mounted within the processing chamber and supports the first disc. The actuator moves the first side of the first disc into contact with the first side of second disc after the processing chamber has been evacuated and a bonding fluid is placed on one of the first and second discs, thereby forming a disc assembly having multiple layers of data.

21 Claims, 2 Drawing Sheets

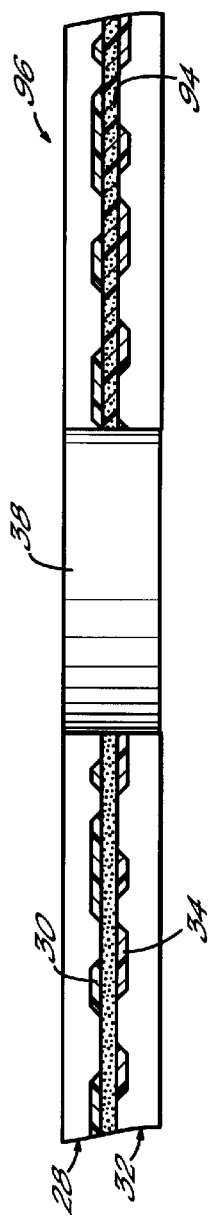
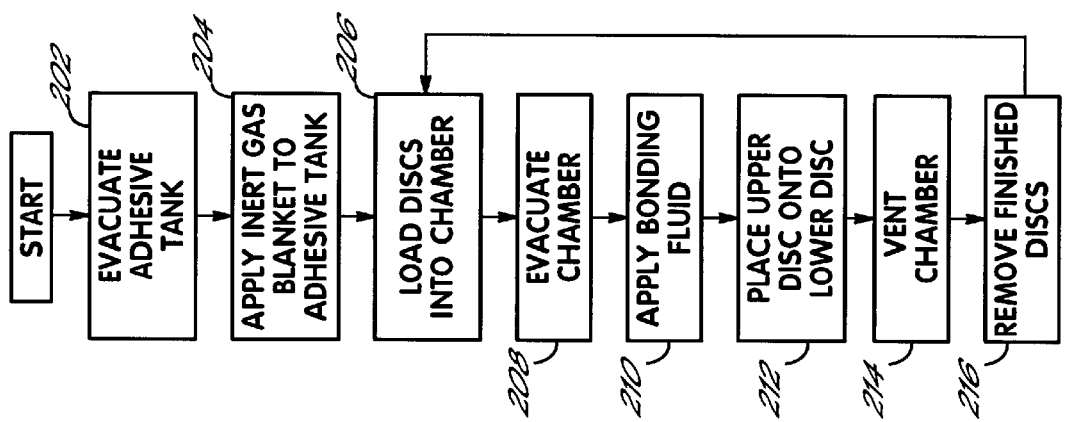
FIG. 3
FIG. 2

APPARATUS AND METHOD FOR USE IN THE MANUFACTURE OF MULTIPLE LAYER OPTICAL DISC

BACKGROUND OF THE INVENTION

This invention relates generally to optical disc manufacturing and more particularly, to the manufacture of multilayer optical discs.

Multilayer discs are now being produced that provide two or more layers of grooves or pits representing recorded or stored data or information. Such discs are generally manufactured by first producing two different discs, each having its own layer of recorded information on one side or surface of the disc. The two discs are then joined by applying an adhesive to one or both of the surfaces of the layers of recorded information and then bringing the discs together. The result is a disc having two adjacent layers of the different information in the middle of the disc in which the layers of information are separated by a transparent, intermediate bonding layer. Each of the two different layers is independently read by focusing a reading head of a laser on a layer of data to be read. Such multilayer discs are often used in DVD applications.

As can be appreciated, any air bubbles or other distortion in the intermediate layer of bonding fluid or adhesive can interfere with the reading of the layer of data or information behind the bonding layer, thereby potentially resulting in reading errors. Therefore, it is critical that the bonding layer be of a constant thickness and free of any air bubbles. Air bubbles can be formed in the process of storing, transferring or applying the bonding fluid or adhesive to the discs or, in the process of bringing the discs together after the adhesive has been applied. Several processes are known that attempt to eliminate air bubbles in the disc bonding process. For example, it is known to apply the bonding resin very slowly, so that air bubbles are not formed in the adhesive application process. In another process, the discs are spun at a high speed to remove air bubbles after the adhesive has been applied. In a further process, the discs are oriented and maintained in parallel as they are brought together in order to minimize the opportunity for air bubbles to form in the joining process. In still other processes, after the bonding adhesive is applied, the discs are moved to a vacuum chamber and brought together; and then, the discs are subjected to a high pressure environment in an autoclave.

While all of the above processes for removing air bubbles are successful, thereby improving the quality of the bonded disc, such processes achieve that success at the price of substantially increasing the processing time required to effect the bonding of the discs, or at the price of requiring additional expensive equipment, or both. Consequently, there is still a need for an improved process for joining optical discs with an intermediate layer of bonding fluid that reliably inhibits the formation of air bubbles and substantially reduces the time to implement the bonding process.

SUMMARY OF THE INVENTION

The present invention provides an improved process for joining optical discs with an intermediate layer of adhesive which eliminates the possibility of the formation of air bubbles. The process of the present invention permits a relatively fast disc bonding cycle while eliminating the formation of air bubbles. The process of the present invention has the advantage of providing the highest quality multilayer optical discs which are completely free of air bubbles.

According to the principles of the present invention and in accordance with the described embodiment, an apparatus for joining two optical discs into a disc assembly having multiple layers of data includes a disc processing chamber for supporting the first and second discs, wherein each of the discs has a layer of data on a first side thereof. The processing chamber is fluidly connected to a tank containing a bonding fluid. A vacuum pump is selectively connectable to the processing chamber and the tank for evacuating air out of each. An actuator is operatively mounted within the processing chamber and supports the first disc. The actuator moves the first side of the first disc into contact with the first side of second disc after the processing chamber has been evacuated and a bonding fluid is placed on one of the first and second discs, thereby forming a disc assembly having multiple layers of data.

In another embodiment, the present invention provides a method of using the above apparatus to evacuate the tank of air and thereafter transfer an inert gas into the tank. The two optical discs are then loaded into the processing chamber, and the processing chamber is evacuated of air. A bonding fluid is thereafter dispensed from the tank onto a data layer of one of the discs, and the discs are brought together so that the data layers are in juxtaposition with an intervening layer of bonding fluid.

These and other objects and advantages of the present invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 2 is a flowchart illustrating the method of operation of the apparatus of FIG. 1.

FIG. 3 is a diametric cross-sectional view of a multilayer optical disc processed in accordance with the principles of the present invention.

DETAILED DESCRIPTION OF THE INVENTION

Figure 1:
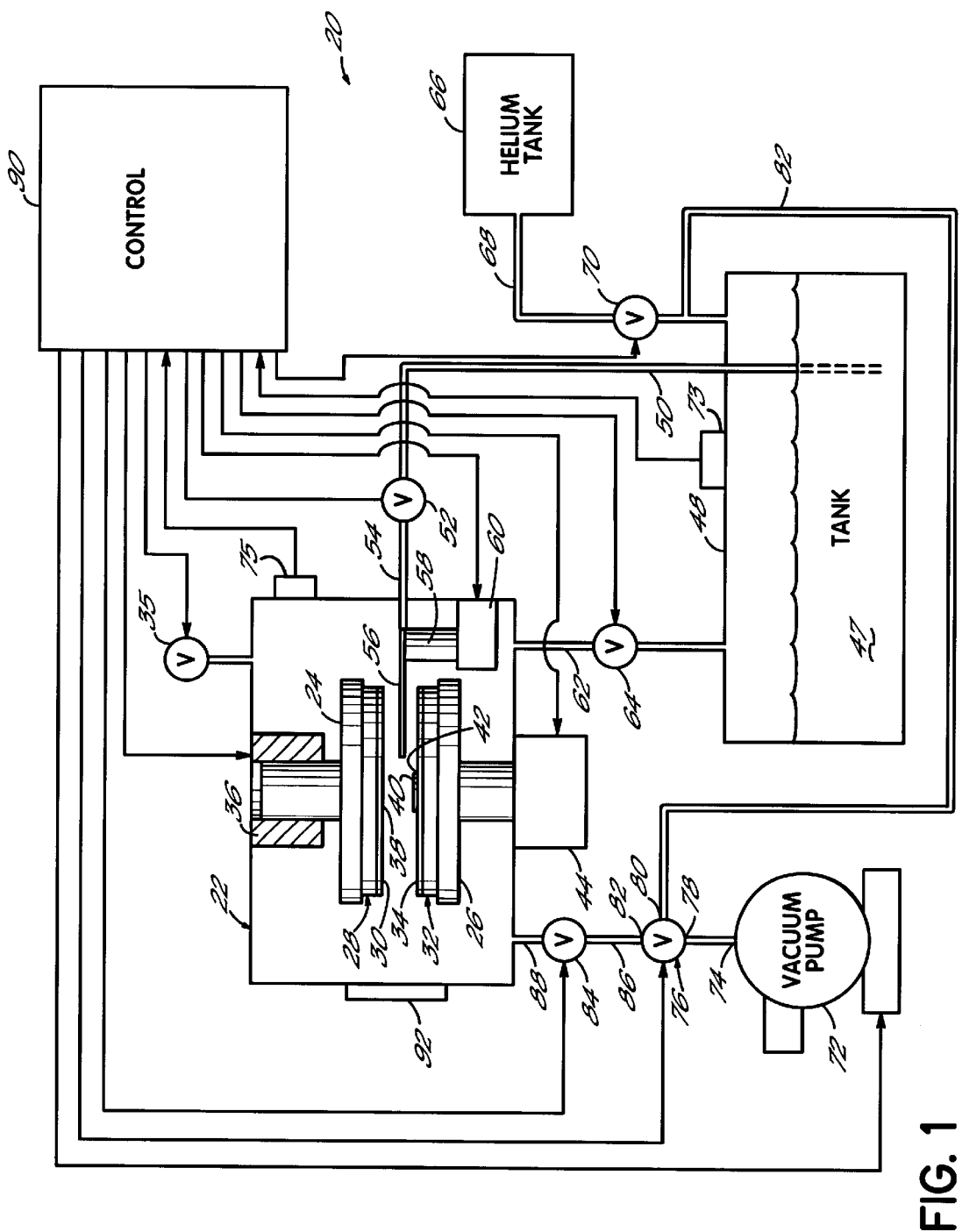
FIG. 1 is a schematic block diagram of apparatus for joining two optical discs with a bonding fluid therebetween in accordance with the principles of the present invention.

Referring to FIG. 1, the processing apparatus 20 includes a processing chamber 22 having an upper disc support 24 and a lower disc support 26. A robotic device (not shown) is utilized in a known manner to load a first optical disc 28 having a first layer of data or information 30 onto the upper disc support 24. The robotic device is also operable to load a second optical disc 32 having a second layer of information or data 34 onto the lower disc support 26. With the current application, the discs are loaded in the processing chamber 22 to have a separation in the range of approximately 0.50 inches to approximately 0.75 inches or more. However, it should be noted that the magnitude of disc separation is not important to and totally independent of the successful practice of the present invention. Normally, a closer disc spacing is correlated to more efficient and faster cycle times. The processing chamber 22 also has a vent valve 35 which may be selectively opened to vent the processing chamber to atmosphere.

The upper disc support 24 preferably has a pneumatic vacuum chuck to secure the first disc 28 to the upper disc support 24. The first disc 28 can alternatively be secured to the upper disc holder 24 by a mechanical locking system of a known design, for example, of the type in which a shaft expands into the center hole 38, thereby securing the disc 28 to the upper disc support 24. The upper disc support 24 is movable in a vertical direction by means of a cylinder 36 having a stroke of a length that the cylinder 36 may be used to lower the first disc 28 onto the second disc 32. The cylinder 36 may be pneumatic or electric.

The lower disc support 26 includes a center spindle 40 extending through the center hole 42 of the second disc 32. The spindle 40 preferably extends above the second layer 34 and thus, facilitates the accurate placement of the first disc 28 onto the second disc 32. The lower disc support 26 is mechanically coupled to a pneumatic or electric motor 44 that rotates the lower disc support 26 and second optical disc 32 while a bonding fluid is being dispensed onto the disc 32.

A bonding fluid or adhesive 47, for example, an ultraviolet ("UV") curable lacquer, is held within a tank 48. A fluid conduit, for example, hard or flexible tubing, 50 carries the bonding fluid from the tank 48 to an input side of a dispensing valve 52. The output side of the dispensing valve 52 is connected to a fluid conduit 54 that extends into the processing tank 22 and terminates with a fluid dispensing head 56. The dispensing valve 52, dispensing head 56 and connecting fluid conduit 54 function together as a fluid dispenser. The dispensing head 56 is supported by a robot arm or a pivot arm 58 that is powered by a pneumatic or electric motor 60. The dispensing head 56 is supported by the robot arm 58 at a first, nondispensing position outside the peripheral boundaries of the discs 30,32. The robot arm 58, at the appropriate times, rotates or pivots the dispensing head 56 to a second, dispensing position, at which the dispensing head preferably extends radially between the discs 30, 32. After dispensing the adhesive, the robot arm 58 then rotates the dispensing head back to the first position. A return fluid conduit 62 functions to return excess bonding fluid from the chamber 22 to the tank 48 through a return valve 64.

A gas tank 66 provides a source of an inert gas, for example, helium, which is provided to the adhesive tank 48 by means of a fluid conduit or pipe 68 and a helium valve 70. A vacuum pump 72 has an inlet 74 fluidly connected to a first port 78 of a 3-way vacuum valve 76. The vacuum valve 76 has a second port 80 fluidly connected to the adhesive tank 48 by means of a fluid conduit 82. The vacuum valve 76 has a third port 82 fluidly connected to one side of a process vacuum valve 84 by means of a fluid conduit 86. The other side of the process vacuum valve 84 is connected to the processing chamber 22 by means of a fluid conduit 88.

The processing chamber 22, vacuum pump 72, actuators 36, 44, 60 and the various valves 35, 52, 64, 70, 76, 84 are electrically connected to a controller 90. The controller 90 can be implemented using any commercially available programmable logic controller such as those available from Allen Bradley, Modicon and others. The controller 90 is programmed to execute a serial sequence of logical operations and provides output signals via various valve and motor drivers to operate processing chamber 22, vacuum pump 72, actuators 36, 44, 60 and the various valves 35, 52, 64, 70, 76, 84 in such a manner as to perform the desired operation of the processing apparatus 20. Generally, the output signals from the controller 90 are binary signals the states of which are operative to open or close a valve or solenoid or turn a motor pump or actuator on or off.

The main purpose of the processing apparatus 20 is to dispense a bonding fluid or adhesive free of air bubbles onto the upper surface of the upper directed layer 34 of the second optical disc 32 and thereafter, bring the layer 30 of the first optical disc 28 into contact with layer 34 of the second optical disc 32 such that the intermediate layer of bonding fluid continues to remain free of air bubbles. To achieve an air bubble free intermediate bonding layer, the adhesive tank 48 is evacuated and filled with an inert gas; and in addition, the bonding fluid is dispensed within an evacuated processing chamber 22.

Referring to FIG. 2, the processing apparatus 20 first, at 202, removes air from the tank 48. To accomplish this, the controller provides output signals to maintain the helium valve 70, the return valve 64, the dispensing valve 52 in their initial or default, closed positions and the vent valve 35 to the processing chamber 22 in its open state. Further, output signals from the controller 90 cause the actuator 36 to maintain the upper disc support 24 in its illustrated upper position and the actuator 60 of the robot arm 58 to locate the dispenser 56 at its first default position outside the periphery of the upper disc support 24. Further, output signals from the controller 90 turn the vacuum pump 72 on and move the three-way vacuum valve 76 to a position providing continuity between the ports 78,80, thereby connecting the inlet 74 of the vacuum pump 72 to the adhesive tank 48. The vacuum pump 72 then evacuates air from the adhesive tank 48.

The controller 90 then determines that the tank 48 is evacuated to a proper less than atmospheric pressure, that is, a partial vacuum. The controller 90 achieves a desired evacuation pressure by evacuating the tank 48 with the pump 72 for a predetermined period of time as determined by a timing function within the controller 90. Alternatively, the controller can monitor an output signal from a pressure sensor 73 in a pressure measuring relationship with the adhesive tank 48 and providing a signal representing the pressure in the tank 48 to the controller 90. When the adhesive tank 48 is evacuated to the proper pressure, the controller 90 then provides an output signal to the valve 76 that switches the valve 76 to a state in which the ports 78,82 are connected within the valve, however, the closed state of the process vacuum valve 84 prevents the vacuum pump 72 from evacuating the processing chamber 22.

The processing apparatus 20 next, at 204, applies a helium blanket to the tank 48. This is accomplished by the controller 90 providing output signals to open the helium valve 70 and also switch the three-way vacuum valve 76 such that the ports 78, 82 are connected within the valve 76. Pressure from the helium tank 66 fills the evacuated space within the adhesive tank 48, and after a predetermined period of time determined by a timer within the controller 90, the controller provides an output signal causing the helium valve 70 to close. With an inert gas such as helium in the tank 48, the probability of air bubbles forming in the bonding fluid within the tank and in its transfer to the processing chamber 22 is close to nil.

Thereafter, the processing apparatus 20, at 206, causes the discs 28, 32 to be loaded into the processing chamber 22. The controller 90, in a known manner, provides output signals to cause an access door 92 to open and a robot (not shown) to load the discs 28, 32 on the respective upper and lower disc supports 24,26. Thereafter, the controller 90 provides output signals to cause the door 92 of the process chamber 22 to close.

Next, the processing apparatus 20, at 208, evacuates the processing chamber 22. To effect this step, the controller 90 provides an output signal to open the process vacuum valve 84 which connects the interior of the processing chamber 22 to the inlet 74 of the vacuum pump 72. The processing chamber 22 is evacuated to a desired pressure less than atmospheric pressure, that is, a partial vacuum, which is determined by the controller 90 either, by means of a passage of a period of time signaled by the expiration of an internal timer or, the detecting of a pressure value from a pressure transducer 75 connected in a pressure measuring relationship to the processing chamber 22.

After the desired partial vacuum pressure in the processing chamber is achieved, the processing apparatus 20 then, at 210, applies the bonding fluid to the upper layer 34 of the lower disc 32. The controller 90 first provides an output signal to the motor 44 to initiate rotation of the lower disc support 26 and the lower disc 32. In addition, an output signal is provided by the controller 90 to the motor 60 to cause the robot arm 58 and dispensing head 56 to rotate from the first position to a second, dispensing position at which the dispensing head 56 is generally above and directed radially with respect to the rotating lower disc 32. The controller 90 then initiates a dispense timing cycle by activating a timer within the controller 90 and simultaneously providing an output signal to open the dispense valve 52. The partial vacuum within the processing chamber 22 causes bonding fluid to be drawn from the tank 48, through the conduit 50, the dispensing valve 52, the conduit 54 and out the dispensing head 56. Dispensing the bonding fluid on the upper surface of the layer 34 of the disc 32 in combination with the rotation of the disc 32 causes the bonding fluid to distribute itself over the upper surface of the layer 34 of the lower disc 32. Upon the internal dispensing timer timing out, the controller 90 changes the state of the output signal to the dispense valve 52, thereby causing the dispense valve 52 to close. In addition, the controller 90 changes the states of the output signals to the motors 44,60, thereby causing the motor 44 to stop the rotation of the lower support 26 and disc 32 and the robot arm 58 to return the dispensing head 56 back to its original first position.

Next, the processing apparatus 20, at 212, causes the upper disc 28 to be lowered onto the lower disc 32. The controller 90, therefore, provides an output signal to the cylinder 36 causing the cylinder to move the upper disc support 24 vertically downward until the upper disc 28 is contacting and resting on top of the lower disc 32 with the bonding fluid therebetween. When the cylinder 36 has reached the end of its downward stroke, the controller 90 provides an output signal to the device securing the upper disc 28 to the upper support 24 to cause the upper disc 28 to be released therefrom. For example, if the upper disc 28 is being held by a vacuum chuck, the controller 90 would provide an output signal to terminate the vacuum, thereby releasing the upper disc 28 from the upper support 24. Alternatively, if the upper disc 28 is being held by a clamp in the center hole 30, the controller 90 would provide an output signal to release the clamp, thereby permitting the disc 28 to drop onto the lower disc 32. After releasing the upper disc 28 from the support 24, the controller 90 then provides a further output signal to the cylinder 36 causing the cylinder to retract the upper support 24 to its original illustrated position. Thus, referring to FIG. 3, a multilayer disc assembly 96 is provided in which a first layer of data 30 of a first optical disc 28 is juxtaposed on top of a second layer of data 34 of a second optical disc 32 with an intervening layer 94 of bonding fluid or adhesive.

Next at 214, the processing apparatus 20 vents the processing chamber 22. To effect this, the controller 90 first provides an output signal to the process vacuum valve 84 causing the process vacuum valve to close and provides a further output signal to the vent valve 35 causing the vent valve to open, thereby releasing the partial vacuum and bringing the pressure within the processing chamber 22 to atmospheric pressure. Upon opening the vent valve 35, the controller 90 also provides an output signal to the return valve 64 causing the return valve to open, thereby permitting excess bonding fluid to drain back into the tank Thereafter, at 216, the processing apparatus 20 causes the assembly of the upper and lower discs 28, 32 with the intervening layer 94 of bonding fluid to be removed from the processing chamber 22. Thus, the controller 90 provides output signals to cause the door 92 to the processing chamber 22 to open and to command the robotic disc loader/unloader to remove the assembly of the upper and lower discs 28,32 with the intervening layer 94 of adhesive. The load/unload robotic device then loads two other optical discs onto the respective upper and lower supports 24,26 within the processing chamber 22 and provides further output signals to close the door 92. The process of FIG. 2 as described with respect to process steps 208–216 is repeated, and thereafter, the process as described with respect to steps 206–216 is repeated to make additional disc assemblies.

The process of the apparatus 20 just described is effective to quickly and efficiently place the two discs 28, 30 in a contacting, bondable relationship with an intervening layer of bonding fluid 94 such that there are no air bubbles in the layer of bonding fluid 94.

The discs are further processed in accordance with known steps, for example, the assembly of the two discs 28, 32 with the intervening layer of bonding fluid 94 are then spun at a high speed to provide a uniform layer 94 of bonding fluid at a consistent, desired thickness prior to being exposed to a flash of ultraviolet light for curing.

While the invention has been illustrated by the description of one embodiment, and while the embodiment has been described in considerable detail, there is no intention to restrict nor in any way limit the scope of the appended claims to such detail. Additional advantages and modifications will readily appear to those who are skilled in the art. For example, with the illustrated embodiment, the bonding fluid is deposited on the lower one of the discs 32; however, as will be appreciated, the bonding fluid may be deposited on either or both of the discs 28, 32. With the described embodiment, the tank 48 is evacuated and filled with an inert gas prior to the discs 28, 32 being loaded into the processing chamber 22; however, consistent with the present invention, the discs 28, 32 may be loaded into the processing chamber 22 prior to the tank 48 being evacuated and filled with an inert gas.

Further, the high speed spinning of the assembly of the two discs 28,32 with the intervening layer of bonding fluid 94 is performed with a separate apparatus outside the processing chamber 22. As will be appreciated, the processing chamber 22 may be designed to provide that high speed spinning process. Further, within the processing chamber 22, the spinning process may occur either under a partial vacuum or at atmospheric pressure. Likewise, it is also within the scope of the invention that the processing chamber 22 may be designed to include a station for exposing the intervening layer of bonding fluid 94 to the ultraviolet light.

The described embodiment includes a return valve 62 located between the processing chamber and the tank 48. As will be appreciated, a return manifold may also be utilized in which return fluid is collected prior to its release into the tank 48. With such an arrangement, the return manifold may include return valves at both ends of the manifold.

The described embodiment utilizes a single vacuum pump 72 and a vacuum valve 76 connected to the tank 48 and the processing chamber 22 to selectively apply a vacuum thereto. As will be appreciated, the processing chamber 22 and the tank 48 may each be connected to a separate vacuum pump, and thus, with two vacuum pumps the vacuum valve 76 can be eliminated.

Therefore, the invention in its broadest aspects is not limited to the specific details shown and described. Consequently, departures may be made from the details described herein without departing from the spirit and scope of the claims which follow.

What is claimed is:

1. An apparatus for joining two optical discs into a multilayer disc having multiple layers of data comprising:
   a processing chamber for supporting first and second discs having first and second layers of data on respective first sides thereof;
   a tank containing a bonding fluid;
   a vacuum pump;
   a vacuum valve connected to the vacuum pump, the tank and the processing chamber for selectively connecting the vacuum pump to one of the tank and the processing chamber;
   a fluid dispenser mounted within the processing chamber and fluidly connected to the tank for dispensing the bonding fluid on the first side of one of the discs after the processing chamber has been evacuated; and
   an actuator operatively connected to the first disc within the processing chamber, the actuator moving the first disc into contact with the second disc after the bonding fluid is dispensed onto the first side of the one of the discs.

2. The apparatus of claim 1 further comprising:
   a source of inert gas; and
   a gas valve connected between the source of inert gas and the tank for selectively providing the inert gas to the tank after the tank has been evacuated.

3. The apparatus of claim 2 wherein the source of inert gas is a source of helium.

4. The apparatus of claim 1 wherein the first disc is supported in the processing chamber with the first side oriented generally horizontally and facing vertically downward and the second disc is supported within the processing chamber with its first side facing vertically upward and substantially parallel to the first side of the first disc.

5. The apparatus of claim 1 further comprising a dispensing valve connected to the tank for selectively passing the bonding fluid to the fluid dispenser.

6. The apparatus of claim 5 further comprising a dispensing head having one end in fluid communication with and receiving the bonding fluid from the dispensing valve and a second end positioned to dispense the bonding fluid on the first side of the one of the discs.

7. The apparatus of claim 1 further comprising a return valve connected between the processing chamber and the tank for transferring excessive bonding fluid from the processing chamber back to the tank.

8. The apparatus of claim 1 further comprising a vent valve connected to the processing chamber for selectively venting the processing chamber to atmospheric pressure.

9. The apparatus of claim 1 further comprising a process vacuum valve connected between the vacuum valve and the processing chamber for selectively connecting the processing chamber to the vacuum valve.

10. The apparatus of claim 1 further comprising a motor operatively connected to the one of the discs for rotating the one of the discs as fluid is dispensed thereon.

11. The apparatus of claim 1 further comprising a robot arm pivotally supporting the dispensing head for pivoting the dispensing head between a nondispensing and a dispensing position.

12. The apparatus of claim 1 further comprising a control operatively connected to the actuator, the vacuum pump, and the valves to control their operation.

13. An apparatus for joining two optical discs into a multilayer disc having multiple layers of data comprising:
   a processing chamber for supporting first and second discs having first and second layers of data on respective first sides thereof;
   a tank containing a bonding fluid and in fluid communication with the processing chamber;
   a vacuum pump;
   a vacuum valve connected to the vacuum pump, the tank and the processing chamber for selectively connecting the vacuum pump to one of the tank and the processing chamber;
   a source of an inert gas in fluid communication with the tank;
   a gas valve connected between the source of inert gas and the tank for selectively providing the inert gas to the tank after the tank has been evacuated;
   a dispensing valve and dispenser mounted within the processing chamber and fluidly connected to the tank for selectively dispensing the bonding fluid on the first side of one of the discs after the processing chamber has been evacuated;
   an actuator operatively connected to the first disc within the processing chamber, the actuator moving the first disc into contact with the second disc after the processing chamber and the tank have been evacuated and a bonding fluid is placed on one of the first and second discs;
   a vent valve connected to the processing chamber for selectively venting the processing chamber to atmospheric pressure after the first disc has been joined with the second disc with the bonding fluid therebetween; and
   a control operatively connected to the actuator, the vacuum pump, and the vacuum, gas, dispensing and vent valves to control their operation.

14. An apparatus for joining two optical discs into a multilayer disc having multiple layers of data comprising:
   a processing chamber for supporting first and second discs having first and second layers of data on respective first sides thereof;
   a tank containing a bonding fluid;
   means for applying a partial vacuum to the processing chamber and the tank;
   a fluid dispenser mounted within the processing chamber and fluidly connected to the tank for dispensing the bonding fluid on the first side of one of the discs after the processing chamber has been evacuated; and
   an actuator operatively connected to the first disc within the processing chamber, the actuator moving the first disc into contact with the second disc after the bonding fluid is dispensed onto the first side of the one of the discs.

15. A method of joining optical discs comprising:

removing air from a tank of bonding fluid, the tank being fluidly connected to a processing chamber;

loading into a processing chamber first and second discs having respective first and second layers of data on respective first sides thereof;

evacuating the processing chamber;

dispensing the bonding fluid directly from the tank into the evacuated processing chamber onto a first side of one of the discs;

placing the first side of the first disc in contact with the first side of the second disc, so that the first sides of the first and second discs are juxtaposed with an intermediate layer of bonding fluid; and venting the processing chamber to atmospheric pressure.

16. The method of claim 15 further comprising transferring an inert gas into the tank after removing air from the tank.

17. The method of claim 16 further comprising pivoting a dispensing head from a nondispensing position to a dispensing position over the one of the discs after evacuating the processing chamber.

18. The method of claim 17 wherein dispensing the bonding fluid further comprises operating a dispense valve fluidly connected between the tank and the dispensing head to transfer the bonding fluid from the tank to the fluid dispenser.

19. The method of claim 18 further comprising rotating the one of the discs while dispensing the bonding fluid.

20. The method of claim 19 further comprising pivoting the dispensing head from the dispensing position back to the nondispensing position prior to placing the first disc onto the second disc.

21. A method of joining optical discs comprising:

providing within a processing chamber first and second discs having first and second layers of data on respective first sides thereof;

evacuating a tank containing a bonding fluid and fluidly connected to the processing chamber;

filling the tank with an inert gas;

applying a partial vacuum to the processing chamber;

transferring the bonding fluid directly from the tank into the partially evacuated processing chamber onto the first side of at least one of the discs;

moving the first side of the first disc in contact with the first side of the second disc, so that the first sides of the first and second discs are juxtaposed with an intermediate layer of bonding fluid; and removing the partial vacuum from the processing chamber.

\* \* \* \* \*